United States Patent
Apdalhaliem et al.

(10) Patent No.: US 9,578,686 B2
(45) Date of Patent: Feb. 21, 2017

(54) AIRCRAFT WINDOW HEATING SYSTEM

(71) Applicant: The Boeing Company, Chicago, IL (US)

(72) Inventors: Sahrudine Apdalhaliem, Seattle, WA (US); Kimberly D. Meredith, Newcastle, WA (US); Morteza Safai, Newcastle, WA (US)

(73) Assignee: THE BOEING COMPANY, Chicago, IL (US)

( * ) Notice: Subject to any disclaimer, the term of this patent is extended or adjusted under 35 U.S.C. 154(b) by 267 days.

(21) Appl. No.: 14/248,782

(22) Filed: Apr. 9, 2014

(65) Prior Publication Data

US 2015/0296565 A1    Oct. 15, 2015

(51) Int. Cl.
| | | |
|---|---|---|
| *B60L 1/02* | (2006.01) | |
| *H05B 1/02* | (2006.01) | |
| *B64C 1/14* | (2006.01) | |
| *H05B 3/84* | (2006.01) | |

(52) U.S. Cl.
CPC .......... *H05B 1/0236* (2013.01); *B64C 1/1484* (2013.01); *B64C 1/1492* (2013.01); *H05B 3/84* (2013.01)

(58) Field of Classification Search
CPC ....... H05B 1/0236; H05B 3/84; B64C 1/1492; B64C 1/1484
USPC .......................... 219/501; 359/265, 275, 289
See application file for complete search history.

(56) References Cited

U.S. PATENT DOCUMENTS

| | | | |
|---|---|---|---|
| 3,446,942 A | 5/1969 | Letsinger et al. | |
| 4,434,358 A | 2/1984 | Apfelbeck et al. | |
| 2002/0113168 A1 | 8/2002 | Rukavina et al. | |
| 2005/0200937 A1* | 9/2005 | Weidner ............... | B64C 1/1484 359/275 |
| 2007/0002422 A1 | 1/2007 | O'Shaughnessy | |
| 2007/0058114 A1* | 3/2007 | Niiyama ................. | G02F 1/13 349/106 |
| 2008/0234893 A1 | 9/2008 | Mitchell et al. | |
| 2013/0087655 A1 | 4/2013 | Eddy | |
| 2014/0268288 A1* | 9/2014 | Driscoll .................... | E06B 9/24 359/275 |
| 2014/0300945 A1* | 10/2014 | Parker .................. | E06B 3/6722 359/275 |

FOREIGN PATENT DOCUMENTS

| | | |
|---|---|---|
| EP | 1600316 B1 | 7/2010 |
| WO | WO2013013662 A1 | 1/2013 |

OTHER PUBLICATIONS

Extended European Search Report, dated Oct. 15, 2015, regarding Application No. EP15161273.6, 7 pages.

* cited by examiner

*Primary Examiner* — Thien S Tran
(74) *Attorney, Agent, or Firm* — Yee & Associates, P.C.

(57) ABSTRACT

A method and apparatus for managing heating of a window system. The apparatus comprises a dimmable window panel and a heating system. The dimmable window panel has an inner portion and an outer portion around the inner portion. The heating system is thermally connected to the outer portion of the dimmable window panel.

20 Claims, 9 Drawing Sheets

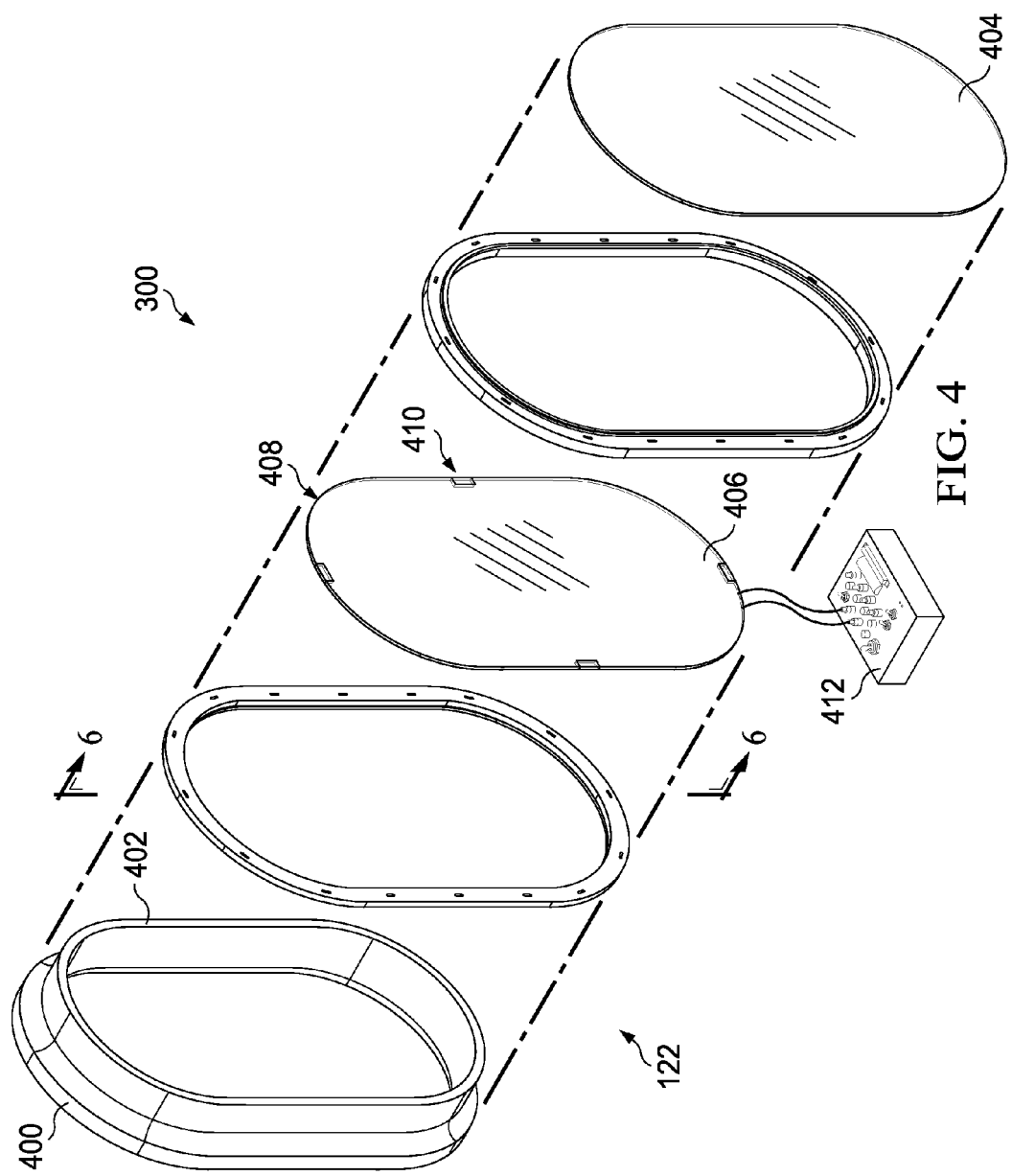
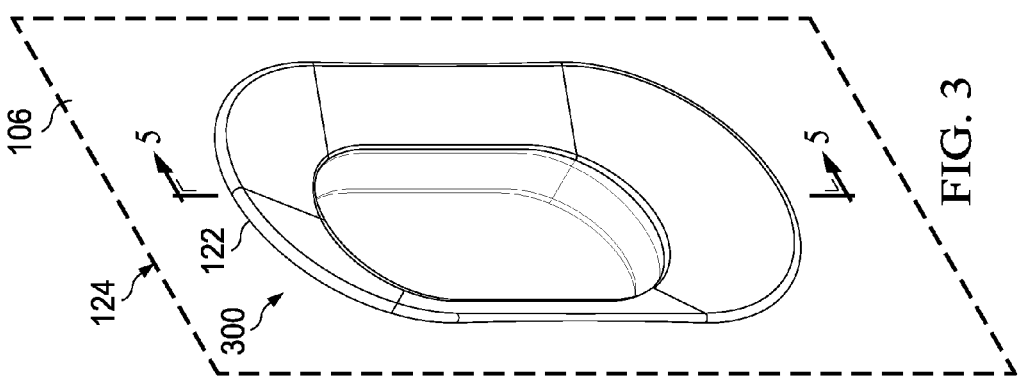

AIRCRAFT WINDOW HEATING SYSTEM

BACKGROUND INFORMATION

1. Field

The present disclosure relates generally to aircraft and, in particular, to dimmable window systems in aircraft. Still more particularly, the present disclosure relates to a method and apparatus for increasing the reliability of dimmable window systems in aircraft.

2. Background

As part of the flying experience in aircraft, passengers may enjoy expansive views of the environment around the aircraft through windows in the passenger cabin. At other times, passengers may wish to reduce the light entering the passenger cabin.

For example, during takeoff, landing, or flight over landmarks, a passenger may wish to see these and other views around the aircraft through the passenger windows. When the passenger wishes to rest or when a movie is played, the passenger may desire to reduce the amount of light entering a window next to the passenger. As another example, the passenger may wish to reduce the amount of light entering a window to reduce heat inside the cabin caused by infrared radiation and ultraviolet radiation in the light.

The amount of light entering the cabin through the passenger window is controlled through a light blocking mechanism such as a window shade. Many aircraft employ mechanical shades that may be lifted up or down to either allow light to enter the cabin or block light from entering the cabin through a window.

With increasing frequency, mechanical shades are being replaced with dimmable windows. A dimmable window panel may be controlled by a passenger to change the amount of light entering passenger cabin.

A dimmable window panel typically changes the light transmission properties of the dimmable window panel when voltage or heat is applied to the window. For example, a dimmable window panel may be transparent, opaque, or may have some intermediate setting between being transparent and opaque. The dimmable window panel may also be referred to as smart glass.

The use of a dimmable window panel enables aircraft manufacturers to reduce weight on the airplane and, at the same time, greatly enhance passengers' flying experience by having the ability to control the amount of light entering into the cabin. For the operator of the aircraft, the maintenance cost is greatly reduced due to a reduction in moving parts. Further, the dimmable window panel may be installed in windows in the aircraft during upgrades or refurbishment of an aircraft. However, the maintenance for aircraft windows employing dimmable window panels may still be more than desired. Therefore, it would be desirable to have a method and apparatus that take into account at least some of the issues discussed above, as well as other possible issues.

SUMMARY

In one illustrative embodiment, an apparatus comprises a dimmable window panel and a heating system. The dimmable window panel has an inner portion and an outer portion around the inner portion. The heating system is thermally connected to the outer portion of the dimmable window panel.

In another illustrative embodiment, a window system comprises a dimmable window panel, a heating system, a sensor system, and a controller. The dimmable window panel has an inner portion and an outer portion around the inner portion. The heating system is thermally connected to the outer portion of the dimmable window panel. The sensor system is configured to detect a difference between a first temperature in the inner portion and a second temperature in the outer portion and generate data regarding the difference. The controller is configured to receive the data from the sensor system. The controller is further configured to control operation of the heating system to maintain a desired temperature difference between the inner portion and the outer portion of the dimmable window panel based on the data received from the sensor system.

In yet another illustrative embodiment, a method for managing heating of a window system is provided. A dimmable window panel in the window system is monitored for an amount of stress. The dimmable window panel has an inner portion and an outer portion. The outer portion of the dimmable window panel is heated when an undesired amount of stress is present.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 3 is an illustration of a window system in accordance with an illustrative embodiment;

FIG. 4 is an illustration of an exploded view of a window system in accordance with an illustrative embodiment;

DETAILED DESCRIPTION

Figure 1:
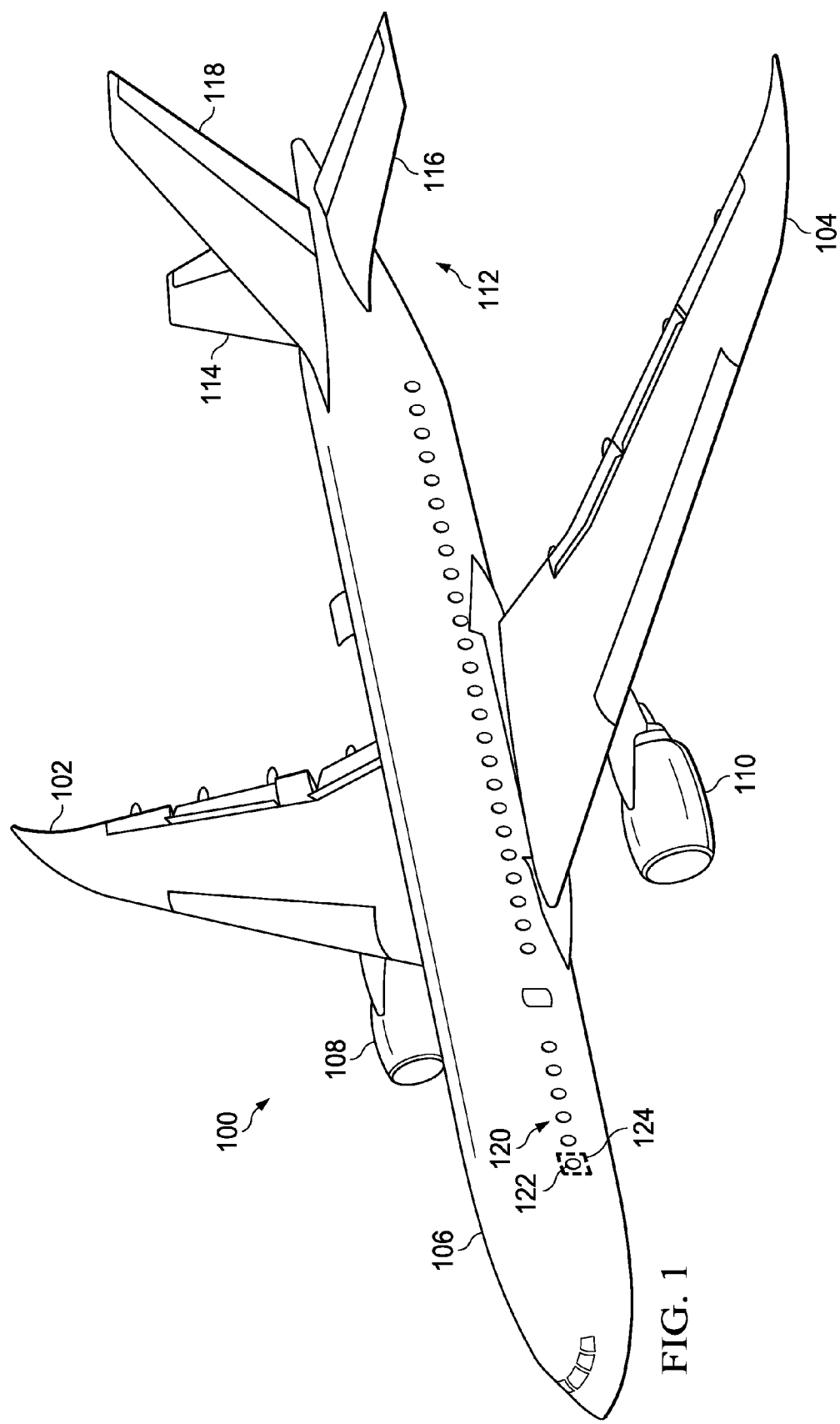
FIG. 1 is an illustration of an aircraft in accordance with an illustrative embodiment.

The illustrative embodiments recognize and take into account one or more different considerations. For example, the illustrative embodiments recognize and take into account that the exposure of a dimmable window panel to the environment may result in greater maintenance than desired.

For example, the illustrative embodiments recognize and take into account that the range of temperatures encountered by the aircraft during normal operation may have a range that causes undesired stress on the dimmable window panel. The range of temperatures may result in differences in the temperature between different portions of a dimmable window panel. These differences may result in an undesired operation of the dimmable window panel occurring from inconsistencies occurring in the dimmable window panel.

The temperature changes may be caused by various environmental factors. For example, exposure to sunlight while the dimmable window panel is in an opaque state causes the dimmable window panel to increase in temperature.

The illustrative embodiments also recognize and take into account that an outer portion of the dimmable window panel may not be exposed to the sunlight. For example, the outer portion may be covered by a structure of the aircraft such that the outer portion of the dimmable window panel is not exposed to sunlight. The structure may be the fuselage of the aircraft, a window reveal, or some other structure. Thus, the outer portion may not heat as fast as the inner portion when the dimmable window panel is exposed to sunlight and in an opaque state.

Further, the outer portion also may be connected to structures that may have temperatures that are reduced from exposure to cold air. As result, the outer portion of the dimmable window panel may have a lower temperature than the inner portion of the dimmable window panel.

In particular, the differences in the temperature between the different portions of a dimmable window panel form temperature gradients. Temperature gradients may result in a deformation in the dimmable window panel. The deformation may cause stress within the dimmable window panel that is great enough to cause an inconsistency to form within the dimmable window panel. In the illustrative examples, stress is a physical quantity and expresses the internal forces that neighboring particles of the continuous material exert on each other. These internal forces may be in the form of compression or tension. The stress caused by deformation from the temperature differences may be referred to as thermal stress.

As a result, the dimmable window panel may operate in an undesired manner. For example, the illustrative embodiments recognize and take into account that the dimmable window panel may no longer have a level of transparency that is substantially uniform across the dimmable window panel, may be unable to change between a transparent state and an opaque state, or may operate in some other undesired manner.

Thus, the illustrative embodiments provide a method and apparatus for managing heating of a window system containing a dimmable window panel in a manner that reduces a temperature gradient that may be present between different portions of the dimmable window panel.

In one illustrative embodiment, an apparatus comprises a dimmable window panel and a heating system. The dimmable window panel has an inner portion and an outer portion around the inner portion. The heating system is thermally connected to the outer portion of the dimmable window panel.

With reference now to the figures and, in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Additionally, window systems 120 are present in body 106. An illustrative embodiment may be implemented in aircraft 100 to manage heating of window systems 120 in body 106. Management of the heating of window systems 120 may be performed in a manner that reduces maintenance needed for window systems 120 in accordance with an illustrative embodiment. A more detailed illustration of window system 122 in window systems 120 in section 124 is shown and described in more detail below after the description in FIG. 2.

Figure 2:
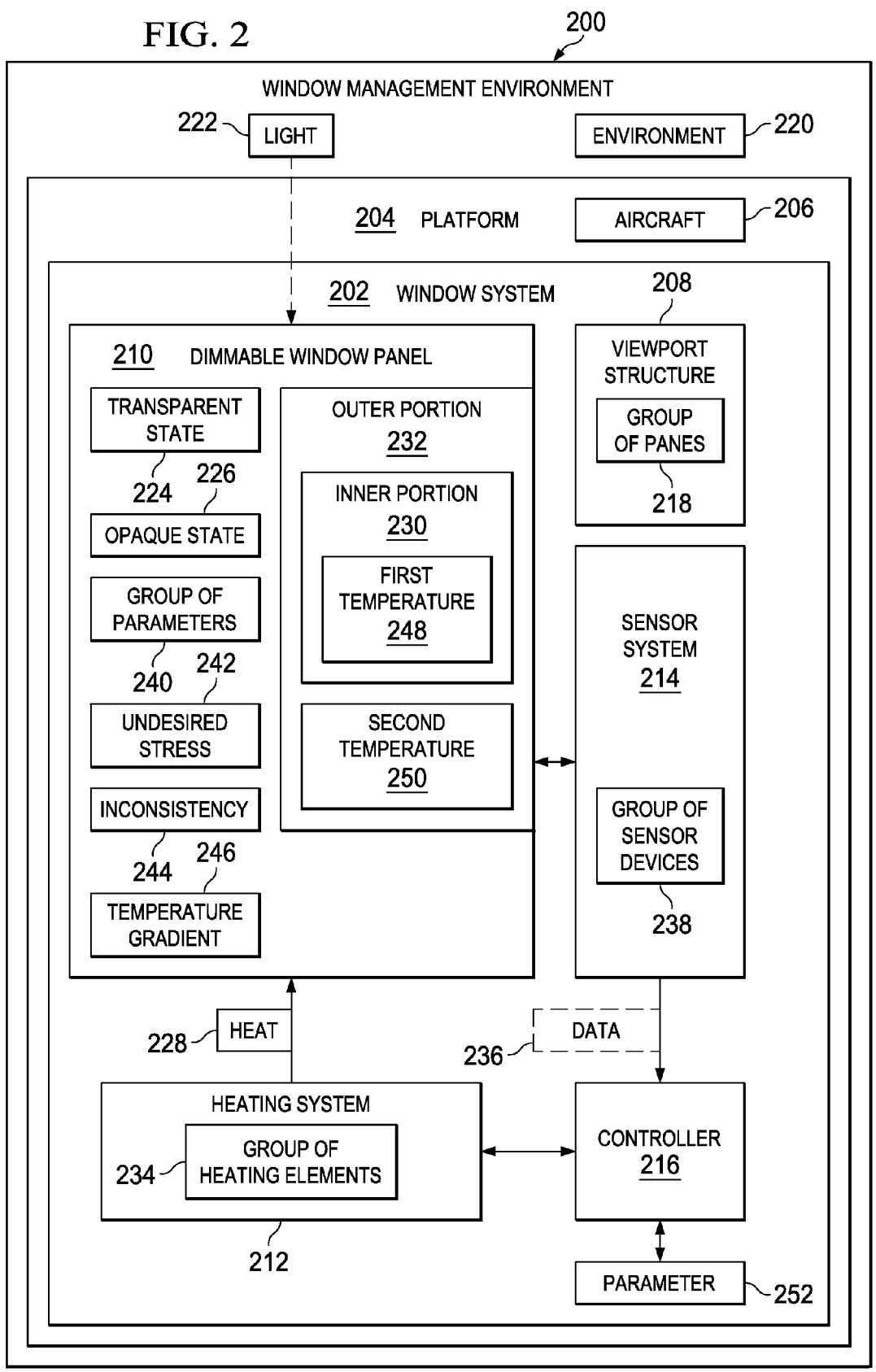
FIG. 2 is an illustration of a block diagram of a window management environment in accordance with an illustrative embodiment.

With reference next to FIG. 2, an illustration of a block diagram of a window management environment is depicted in accordance with an illustrative embodiment. In this illustrative example, window management environment 200 is an environment in which window system 202 in platform 204 may be managed in a manner that reduces maintenance that may be needed for window system 202.

In this illustrative example, platform 204 takes the form of aircraft 206. Aircraft 100 in FIG. 1 is an example of a physical implementation for aircraft 206 shown in block form in FIG. 2.

As depicted, window system 202 includes a number of different components. In this illustrative example, window system 202 includes viewport structure 208, dimmable window panel 210, heating system 212, sensor system 214, and controller 216.

In the illustrative example, viewport structure 208 includes group of panes 218. Viewport structure 208 is a structural component in window system 202. Viewport structure 208 separates an interior of aircraft 206 from environment 220. For example, viewport structure 208 is designed to withstand pressure differences between the interior of aircraft 206 and environment 220 on the outside of aircraft 206.

In these illustrative examples, group of panes 218 is substantially transparent. Group of panes 218 is configured to allow a passenger or other person within aircraft 206 to view the environment outside of aircraft 206 through group of panes 218. As used herein, a "group of," when used with reference to an item, means one or more items. For example, group of panes 218 is one or more panes. Group of panes 218 may be comprised of at least one of polymethyl methacrylate (PMMA), polycarbonate, glass, plastic, or other suitable materials.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

The materials and dimensions for group of panes 218 may be selected based on environment 220. In this illustrative example, environment 220 is one in which group of panes 218 may be exposed during operation of aircraft 206. As depicted, parameters for environment 220 may include at least one of temperature, pressure, or other suitable environmental factors.

In this illustrative example, dimmable window panel 210 may change the amount of light 222 that enters aircraft 206 through window system 202. Dimmable window panel 210 is configured to change light transmission properties. In this illustrative example, dimmable window panel 210 has transparent state 224 and opaque state 226. In transparent state 224, light 222 is allowed to pass through dimmable window panel 210. In opaque state 226, light 222 is blocked from passing through dimmable window panel 210. The amount of light 222 may include at least one of intensity or wavelengths.

Further, dimmable window panel 210 may be controlled to have some other state in between transparent state 224 and opaque state 226. In these other states, the amount of light 222 that passes through dimmable window panel 210 is somewhere between substantially all of light 222 and substantially none of light 222.

In the illustrative examples, dimmable window panel 210 may change light transmission properties in response to at least one of voltage, light, or heat applied to dimmable window panel 210. In these illustrative examples, dimmable window panel 210 may be implemented using any device that is capable of changing light transmission properties. For example, dimmable window panel 210 may be implemented using a device selected from one of an electrochromic device, a photochromic device, a thermochromic device, a suspended particle device, a micro-blind device, a liquid crystal device, or any other suitable device. As depicted, dimmable window panel 210 is implemented using an electrochromatic device that changes transmission properties based on the voltage applied to the electrochromatic device.

Heating system 212 is a hardware system and is thermally connected to dimmable window panel 210. Heating system 212 is configured to generated heat 228. Thermally connected means that heat may flow from one component, heating system 212, to another component, dimmable window panel 210. The thermal connection may be made using one or more structures comprised of one or more materials that conduct heat. The thermal connection may also be made by placing the first component, heating system 212, in contact with the second component, dimmable window panel 210. In other words, heating system 212 is connected to dimmable window panel 210 in a manner that allows for heat 228 to flow from heating system 212 to dimmable window panel 210.

In the illustrative example, heating system 212 may be directly or indirectly connected to dimmable window panel 210. With an indirect connection, a group of thermally conductive structures may connect heating system 212 to dimmable window panel 210.

In the illustrative example, dimmable window panel 210 has inner portion 230 and outer portion 232. As depicted, outer portion 232 is located around inner portion 230. Heating system 212 is thermally connected to outer portion 232 in the illustrative example.

As depicted, heating system 212 includes group of heating elements 234. In the illustrative example, group of heating elements 234 may take various forms. For example, group of heating elements 234 may be selected from at least one of a resistive element and a thermoelectric heating device, a hot air device that directs hot air to outer portion 232, or other suitable heating devices.

In the illustrative example, sensor system 214 is a hardware system and is configured to generate data 236. Data 236 is sent to controller 216. Controller 216 uses data 236 to control the operation of heating system 212.

In these illustrative examples, sensor system 214 is comprised of group of sensor devices 238. A sensor device in group of sensor devices 238 may detect group of parameters 240 for dimmable window panel 210. As depicted, group of sensor devices 238 may be implemented using a number of different devices. For example, group of sensor devices 238 may be selected from at least one of one of a strain gauge, an axial strain gauge, a rosette gauge, a thermometer, an infrared signature sensor, a thermocouple, or other suitable device.

As depicted, controller 216 may be implemented in software, hardware, firmware or a combination thereof. When software is used, the operations performed by controller 216 may be implemented in program code configured to run on a processor unit. When firmware is used, the operations performed by controller 216 may be implemented in program code and data and stored in persistent memory to run on a processor unit. When hardware is employed, the hardware may include circuits that operate to perform the operations in controller 216.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

For example, controller 216 may be a computer system in aircraft 206. The computer system may be one or more computers. When more than one computer is present, the computers may communicate with each other with a communications medium such as a network. In another illustrative example, controller 216 may be a hardware device implemented in an integrated circuit.

Controller 216 controls the operation of heating system 212. For example, controller 216 may control the generation of heat 228 by heating system 212. Controller 216 causes heating system 212 to generate heat 228 when undesired stress 242 is present in dimmable window panel 210.

Undesired stress 242 is an amount of stress that may cause inconsistency 244 to form in dimmable window panel 210. Undesired stress 242 also may be a threshold value for stress that is less than an amount of stress that may cause inconsistency 244 to form in dimmable window panel 210. In other words, undesired stress 242 may be a level of stress that is less than the amount of stress that causes inconsistency 244 to form in dimmable window panel 210.

In the illustrative examples, undesired stress 242 may result from temperature gradient 246 in dimmable window panel 210. In particular, temperature gradient 246 may be a result of a difference between first temperature 248 in inner portion 230 and second temperature 250 in outer portion 232.

In the illustrative example, inconsistency 244 may be a crack. Inconsistency 244 may be any other inconsistency that may cause dimmable window panel 210 to not operate in a desired manner.

During operation, heating system 212 is configured to heat outer portion 232 in a manner that reduces temperature gradient 246 between inner portion 230 and outer portion 232 of dimmable window panel 210. In this manner, heating system 212 reduces undesired stress 242 in dimmable window panel 210.

This heating is performed under the control of controller 216 in the illustrative examples. For example, controller 216 is configured to control operation of heating system 212 such that a desired temperature difference between inner portion 230 and outer portion 232 of dimmable window panel 210 is maintained.

Controller 216 receives data 236 from sensor system 214 and uses data 236 to determine when undesired stress 242 is present in dimmable window panel 210. In this example, a difference between first temperature 248 in inner portion 230 and second temperature 250 in outer portion 232 may be identified using parameter 252 selected from one of stress, deformation, strain, temperature, and some other parameter that may be used to identify undesired stress 242 in dimmable window panel 210. Parameter 252 may be in data 236 or identified from data 236.

The illustration of window management environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, platform 204 may take other forms other than aircraft 206. Platform 204 may be, for example, a mobile platform, a stationary platform, a land-based structure, an aquatic-based structure, and a space-based structure. More specifically, platform 204, may be a surface ship, a tank, a personnel carrier, a train, a spacecraft, a space station, a satellite, a submarine, an automobile, a power plant, a bridge, a dam, a house, a manufacturing facility, a building, and other suitable platforms.

As another example, aircraft 206 may include one or more window systems in addition to window system 202. Also, controller 216 may control heating systems in additional window systems in addition to window system 202. Controller 216 also may control changing dimmable window panel 210 between transparent state 224 and opaque state 226.

Turning next to FIG. 3, an illustration of a window system is depicted in accordance with an illustrative embodiment. An enlarged view of window system 122 in section 124 is shown in this figure. Window system 122 is an example of a physical implementation of window system 202 shown in block form in FIG. 2. As can be seen in section 124, window system 122 has viewport structure 300. Viewport structure 300 is an example of a physical implementation for viewport structure 208 in FIG. 2.

Next, FIG. 4 is an illustration of an exploded view of a window system in accordance with an illustrative embodiment. In this exploded view, outer pane 400, inner pane 402, and dust cover 404 in viewport structure 300 in window system 122 are shown. Also seen in this exploded view are dimmable window panel 406, heating system 408, sensor system 410, and controller 412.

In this illustrative example, outer pane 400 and inner pane 402 are bonded together such that no air gap is present between outer pane 400 and inner pane 402. In other illustrative examples, outer pane 400 and inner pane 402 may not be bonded together and an air gap may be present between outer pane 400 and inner pane 402.

In the illustrative example, dimmable window panel 406, heating system 408, sensor system 410, and controller 412 are examples of physical implementations for dimmable window panel 210, heating system 212, sensor system 214, and controller 216 shown in block form in FIG. 2.

Figure 5:
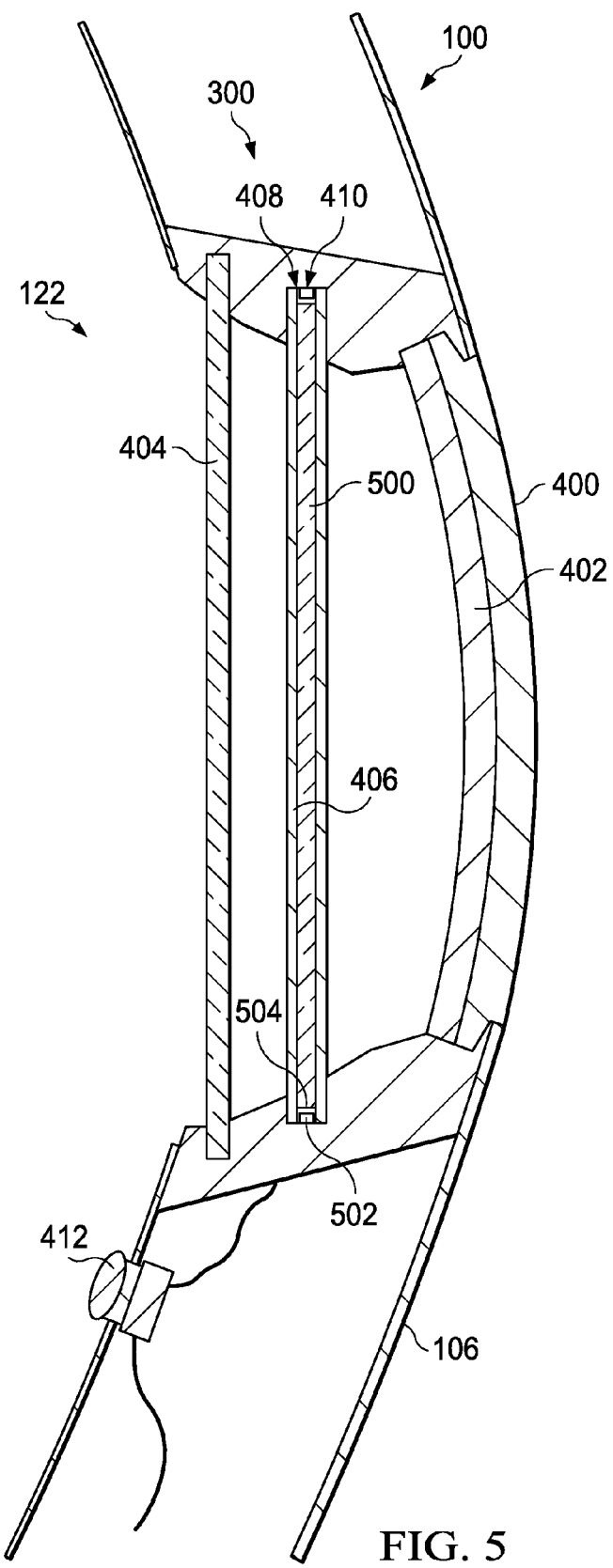
FIG. 5 is an illustration of a cross sectional view of a window system in accordance with an illustrative embodiment.

Turning to FIG. 5, an illustration of a cross sectional view of a window system is depicted in accordance with an illustrative embodiment. In FIG. 5, a cross sectional view of window system 122 is shown taken along lines 5-5 in FIG. 3.

In this cross sectional view, dimmable window panel 406 has inner portion 500 and outer portion 502. Outer portion 502 is around inner portion 500 in this example. Heating system 408 is thermally connected to dimmable window panel 406. As depicted, heating system 408 comprises heating element 504 that is directly connected to outer portion 502 of dimmable window panel 406. In other words, heating element 504 is in direct contact with outer portion 502 of dimmable window panel 406.

In other examples, heating element 504 in heating system 408 may be indirectly connected to outer portion 502 of dimmable window panel 406. For example, a layer of a thermally conductive material may be located between heating element 504 and dimmable window panel 406.

Outer portion 502 is a portion of dimmable window panel 406 that is around inner portion 500. For example, outer portion 502 may be the portion of dimmable window panel 406 that is not exposed to light. This portion may be, for example, the portion covered by a reveal in body 106 of aircraft 100.

Figure 6:
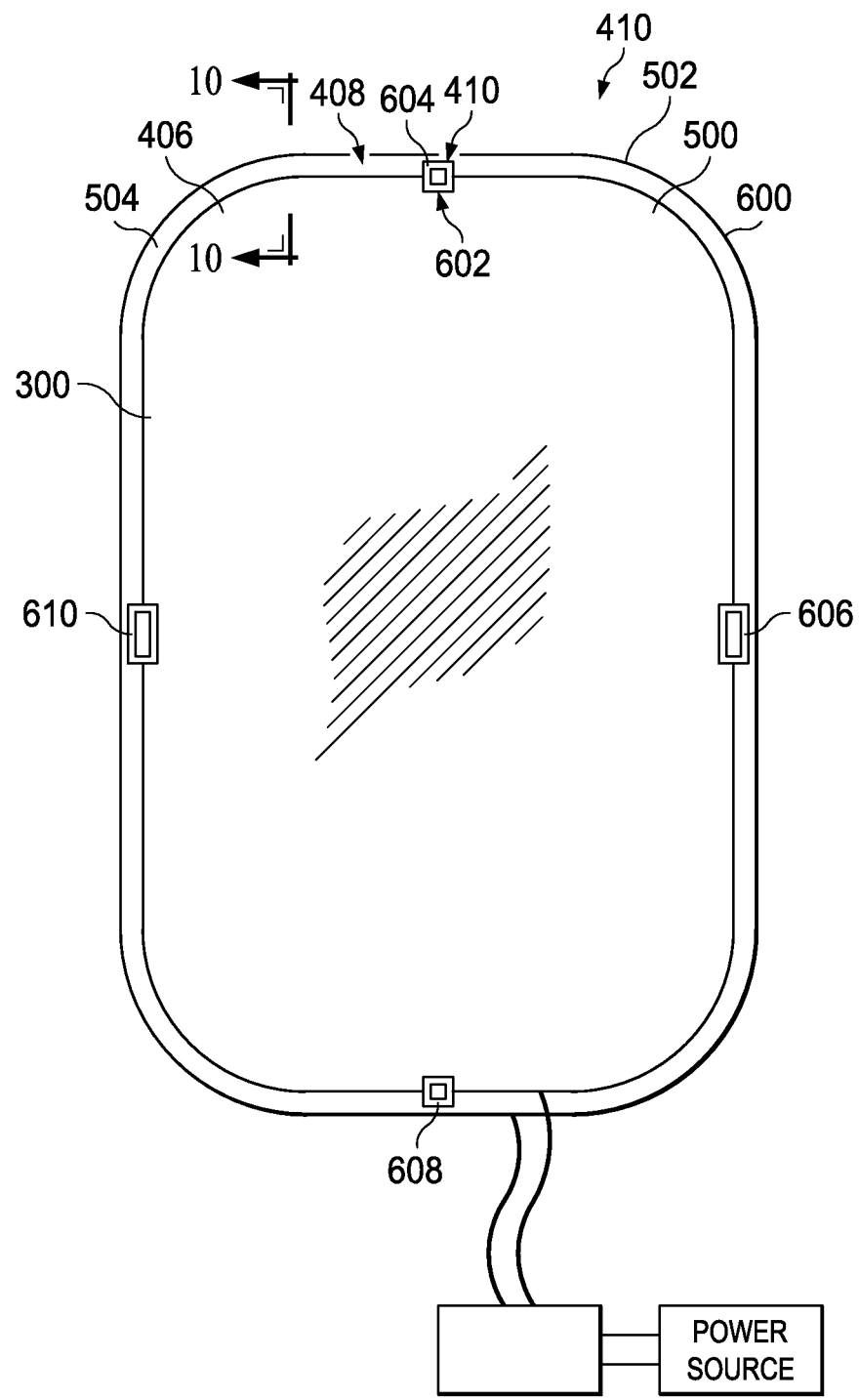
FIG. 6 is an illustration of a dimmable window panel with a heating system and a sensor system in accordance with an illustrative embodiment.

With reference now to FIG. 6, an illustration of a dimmable window panel with a heating system and a sensor system is depicted in accordance with an illustrative example. Dimmable window panel 406, heating system 408, and sensor system 410 are shown in the direction of lines 6-6 in FIG. 4. In this view, other components such as outer pane 400, inner pane 402, dust cover 404, and controller 412 are not shown to more clearly describe heating of dimmable window panel 406.

In this view, heating system 408 is comprised of heating element 600. Heating element 600 covers outer portion 502. In this illustrative example, heating element 600 is a resistive heating element.

In some illustrative examples, heating element 600 may cover only some of outer portion 502. In other illustrative examples, heating element 600 may cover inner portion 500 as well as a portion of outer portion 502.

Further in this view, sensor system 410 includes group of sensor devices 602. In this illustrative example, group of sensor devices 602 comprises strain gauge 604, strain gauge 606, strain gauge 608, and strain gauge 610. Strain gauges are sensor devices that measure strain. Strain is a normalized measure of deformation representing displacement between particles in a body or structure such as dimmable window panel 406. In other words, the strain gauges measure deformation in the structure of dimmable window panel 406.

The sensor devices generate data that may be used to determine whether the amount of stress in dimmable window panel 406 is at an undesired level. This data is then used to control the operation of heating system 408 in a manner that reduces the stress in dimmable window panel 406.

Figure 7:
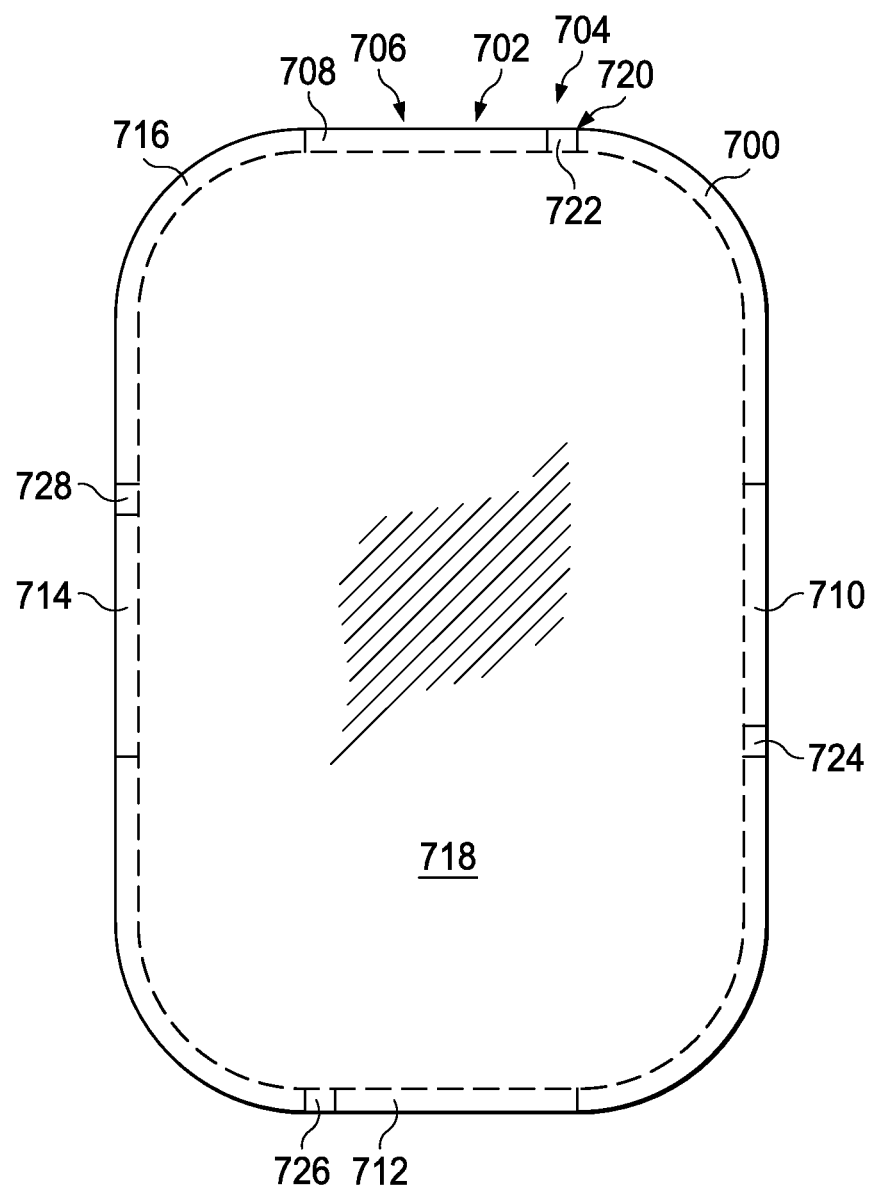
FIG. 7 is an illustration of a dimmable window panel with a heating system and a sensor system in accordance with an illustrative embodiment.

Turning now to FIG. 7, an illustration of a dimmable window panel with a heating system and a sensor system is depicted in accordance with an illustrative example. In this example, dimmable window panel 700 is thermally connected to heating system 702. Sensor system 704 is also connected to dimmable window panel 700. Dimmable window panel 700, heating system 702, and sensor system 704 are examples of physical implementations for dimmable window panel 210, heating system 212, and sensor system 214 shown in block form in FIG. 2.

In this illustrative example, heating system 702 includes group of heating elements 706. As depicted, group of heating elements 706 include heating element 708, heating element 710, heating element 712, and heating element 714. Each heating element is thermally connected to outer portion 716 of dimmable window panel 700. As can be seen, outer portion 716 is located around inner portion 718 of dimmable window panel 700.

In this illustrative example, sensor system 704 is comprised of groups of sensor devices 720. Group of sensor devices 720 is comprised of strain gauge 722, strain gauge 724, strain gauge 726, and strain gauge 728.

The illustrations of window system 122 in FIGS. 1 and 3-7 are not meant to imply physical or architectural mutations manner in which a window system may be implemented. For example, heating element 600 in FIG. 6 may cover only some of outer portion 502. In other illustrative examples, heating element 600 may cover inner portion 500 as well as a portion of outer portion 502. In other illustrative examples, one or more additional heating elements may be present and may not cover all of outer portion 502. In still another illustrative example, heating system 212 may be present for outer pane 400 and inner pane 402 in addition to heating element 600.

In other illustrative examples, heating element 600 may be implemented using other types of devices in addition to or in place of a resistive heating element. For example, heating element 600 may be a thermoelectric heating device, a device that directs hot air around outer portion 502, a nichrome (80% Ni/20% Cr) wire, a nichrome strip, a FeCeAL wire, a cupronickel (CuNi) wire, a ceramic heating element, a thin film heating element comprising platinum, molybdenum, or some other suitable heating device. Further, other numbers of heating elements and sensor devices may be used in addition to or in place of the ones depicted in FIGS. 6 and 7. In the illustrative examples, a thin film heating element is a heating element that has a thickness from about a fraction of a nanometer, such as a monolayer, to about several micrometers.

Additionally, in some illustrative examples, the sensor devices may not be directly connected to the dimmable window panels. For example, infrared sensors may be used to detect temperatures or strain in the dimmable window panel. Further, the heating element may be thermally coupled to the dimmable window panel through an air interface. For example, the heating element may radiate heat onto the dimmable window panel.

The different components shown in FIGS. 1 and 3-7 may be combined with components in FIG. 2, used with components in FIG. 2, or a combination of the two. Additionally, some of the components in FIGS. 1 and 3-7 may be illustrative examples of how components shown in block form in FIG. 2 can be implemented as physical structures.

Figure 8:
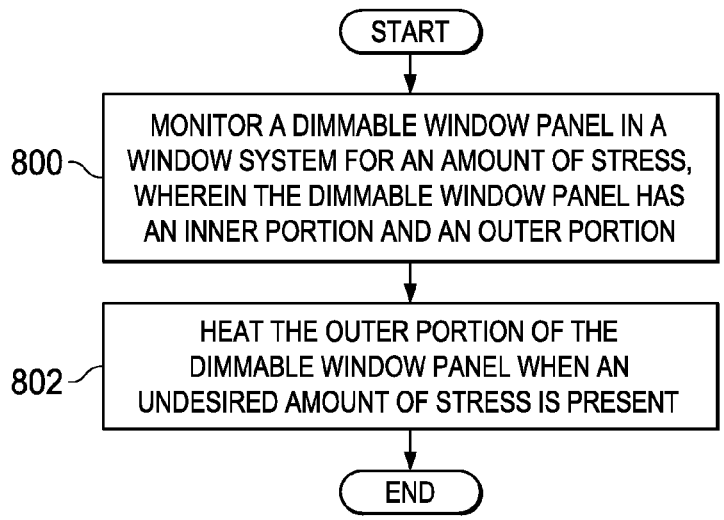
FIG. 8 is an illustration of a flowchart of a process for managing heating of a dimmable window panel in a window system in accordance with an illustrative embodiment.

With reference now to FIG. 8, an illustration of a flowchart of a process for managing heating of a dimmable window panel in a window system is depicted in accordance with an illustrative embodiment. The process illustrated in FIG. 8 may be implemented in window management environment 200 in FIG. 2. The different operations may be implemented in window system 202 and, in particular, control of the operations may be performed by controller 216 in window system 202.

The process begins by monitoring a dimmable window panel in a window system for an amount of stress, wherein the dimmable window panel has an inner portion and an outer portion (operation 800). The process heats the outer portion of the dimmable window panel when an undesired amount of stress is present (operation 802), with the process terminating thereafter.

Figure 9:
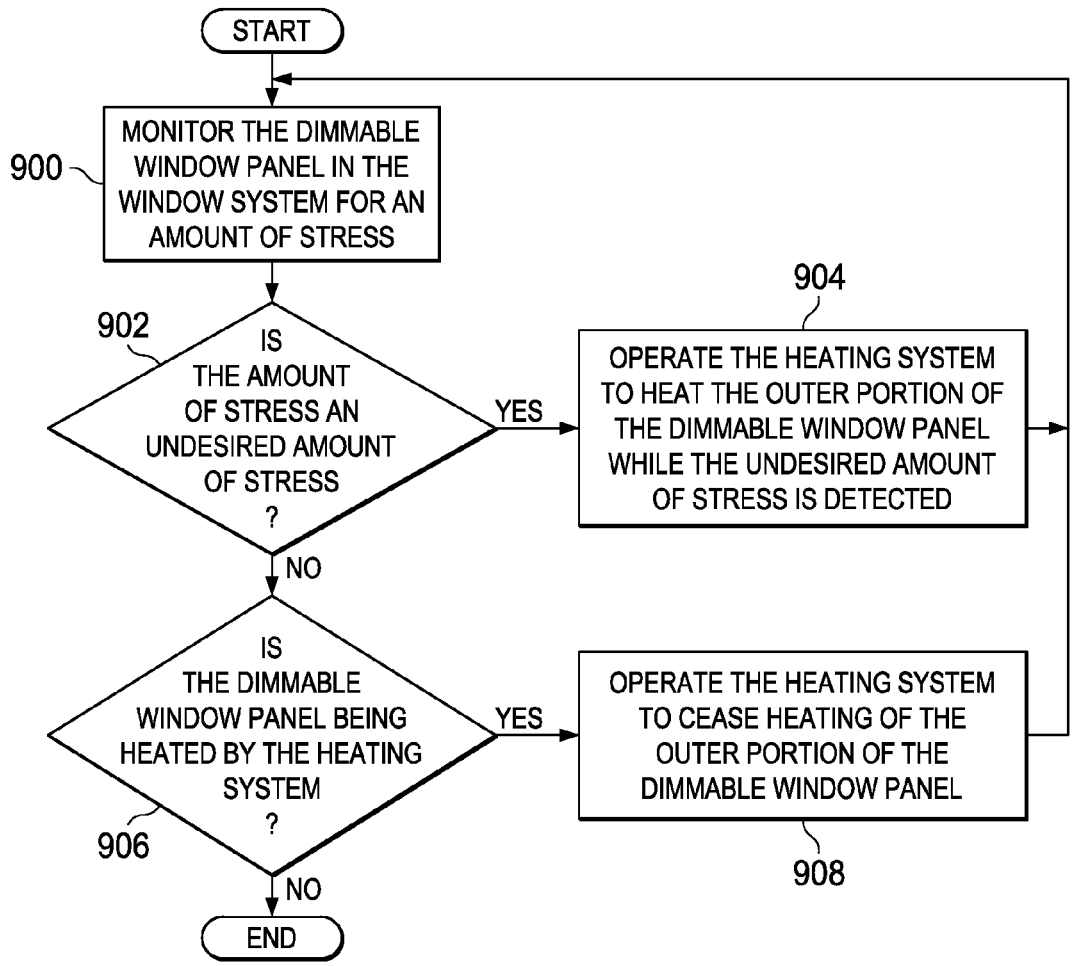
FIG. 9 is a more detailed illustration of a flowchart of a process for managing heating of a dimmable window panel in a window system in accordance with an illustrative embodiment.

Turning next to FIG. 9, a more detailed illustration of a flowchart of a process for managing heating of a dimmable window panel in a window system is depicted in accordance with an illustrative embodiment. The process illustrated in this figure also may be implemented in window system 202 in FIG. 2. In this example, the process may be implemented in controller 216 in window system 202 to control heating of dimmable window panel 210 in a manner that reduces undesired stress 242 in dimmable window panel 210.

The process begins by monitoring the dimmable window panel in the window system for an amount of stress (operation 900). In operation 900, the monitoring may be performed by detecting the amount of stress in the dimmable window panel using a sensor system. The amount of stress may be identified through data received from the sensor system. The sensor system may identify the stress by detecting at least one of a deformation in the dimmable window panel or a temperature gradient between the inner portion and outer portion of the dimmable window panel, or in some other suitable manner. The deformation may be detected as strain. Temperature differences between a first temperature in the inner portion and a second temperature in the outer portion of the dimmable window panel may be used to identify strain or stress. These temperatures also may be inferred through a parameter selected from one of stress, deformation, strain, temperature, or some other suitable parameter.

A determination is made as to whether the amount of stress is an undesired amount of stress (operation 902). In particular, a dimmable window panel may be able to withstand different amounts of stress on its design. The undesired amount of stress may vary depending on the materials used in the dimmable window panel. Thus, the undesired amount of stress may be a threshold value set at or under the value for the amount of stress that the dimmable window panel may be able to withstand without deformation of an inconsistency.

For example, thermal stress for a dimmable window panel may expressed as follows:

$$\sigma_{thermal} = \alpha E \Delta T \quad (1)$$

where $\sigma_{thermal}$ is thermal stress, $\alpha$ is the thermal expansion coefficient, E is Young's modulus, and $\Delta T$ is the temperature change between two different locations. In this example, $\Delta T$ is the temperature gradient between an inner portion of the dimmable window panel and an outer portion of the dimmable window panel.

The temperature changes may be identified as follows:

$$\Delta T = T_I - T_O \qquad (2)$$

where $T_I$ is a temperature in the inner portion and $T_O$ in the temperature in the outer portion. Thus, if the thermal stress generated during operating conditions is greater than the allowable thermal stress for the dimmable window panel in this example, an undesired amount of stress is present in the dimmable window panel.

If the amount of stress is an undesired amount of stress, the process operates the heating system to heat the outer portion of the dimmable window panel while the undesired amount of stress is detected (operation 904). The process then returns to operation 900.

The heating in operation 904 increases the temperature of the outer portion of the dimmable window panel in a manner that reduces a temperature difference between the inner portion and the outer portion. As a result, the stress on the dimmable window panel may be reduced such that the stress is no longer an undesired amount of stress or closer to the amount of stress desired to reduce deformation of an inconsistency. In operation 902, if the amount of stress is not an undesired amount of stress, a determination is made as to whether the dimmable window panel is being heated by the heating system (operation 906). If the dimmable window panel is being heated by the heating system, the process operates the heating system to cease heating of the outer portion of the dimmable window panel (operation 908). The process then returns to operation 900. If the dimmable window panel is not being heated by the heating system, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 10:
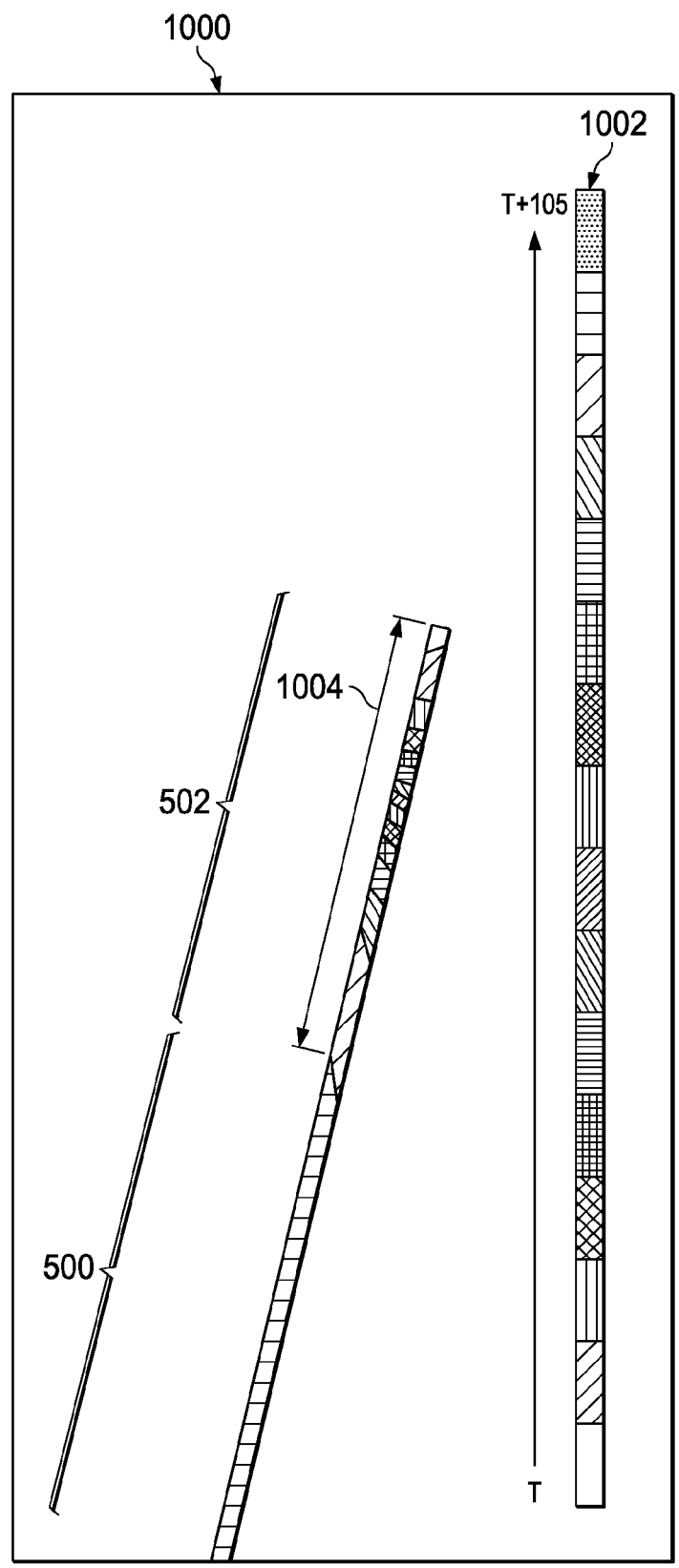
FIG. 10 is an illustration of temperatures in a dimmable window panel in accordance with an illustrative embodiment.

Turning next to FIG. 10, an illustration of temperatures in a dimmable window panel is depicted in accordance with an illustrative embodiment. As depicted, graph 1000 illustrates temperatures in dimmable window panel 406 in FIG. 6 for a cross section of dimmable window panel 406 taken along lines 10-10 in FIG. 6.

The temperature differences in dimmable window panel 406 are identified using legend 1002. In this example, outer portion 502 of dimmable window panel 406 shows a temperature gradient of about 105° F. as compared to inner portion 500 of dimmable window panel 406. In this example, outer portion 502 has width 1004. Width 1004 is about 1.5 inches in this example.

For example, when dimmable window panel 406 is in an opaque state, inner portion 500 may have a first temperature that is higher than desired as compared to a second temperature of outer portion 502. The temperature difference may be greater than a desired level. For example, the temperature difference may be about 105° F. This difference in temperatures results in a deformation in dimmable window panel 406. The deformation may result in an undesired stress on dimmable window panel 406. This undesired stress may be at a level or threshold value under a level at which inconsistencies may occur in dimmable window panel 406.

An inconsistency may include, for example, a crack in dimmable window panel 406. Although this inconsistency might not affect the structure of the window system with respect to maintaining pressure differences between the environment outside of the aircraft and within the cabin, the dimmable window panel may no longer perform as desired. For example, the dimmable window panel may not change between a transparent state and an opaque state. As another example, the dimmable window panel may not provide a substantially uniform transparency across the dimmable window panel.

The heating system in the illustrative examples is configured to reduce the difference between the first temperature and the second temperature. In particular, the heating system is configured to heat at inner portion 500 in a manner that increases the second temperature of outer portion 502. In this manner, the amount of stress in dimmable window panel 406 may be reduced. The reduction may reduce or avoid undesired stress within the dimmable window panel 406. In this manner, the formation of inconsistencies may be reduced in a manner that reduces maintenance needed for dimmable window panel 406.

Figure 11:
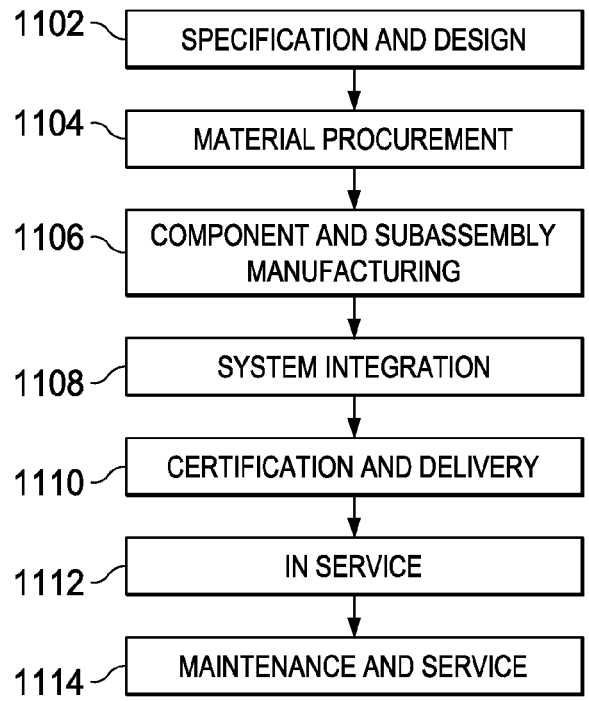
FIG. 11 is an illustration of a block diagram of an aircraft manufacturing and service method in accordance with an illustrative embodiment.
Figure 12:
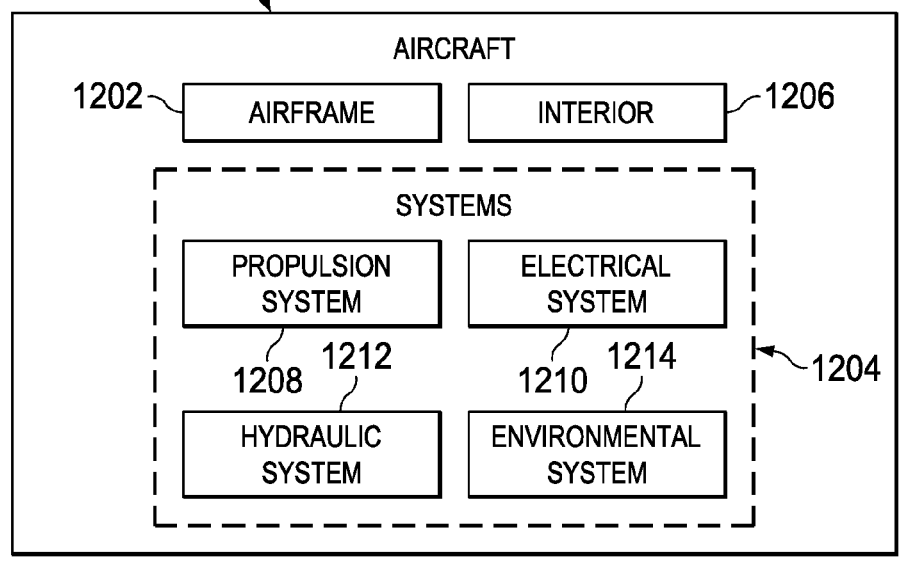
FIG. 12 is an illustration of a block diagram of an aircraft in which an illustrative embodiment may be implemented.

The illustrative embodiments of the disclosure may be described in the context of aircraft manufacturing and service method 1100 as shown in FIG. 11 and aircraft 1200 as shown in FIG. 12. Turning first to FIG. 11, an illustration of a block diagram of an aircraft manufacturing and service method is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 in FIG. 12 takes place. Thereafter, aircraft 1200 in FIG. 12 may go through certification and delivery 1110 in order to be placed in service 1112. While in service 1112 by a customer, aircraft 1200 in FIG. 12 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of a block diagram of an aircraft is depicted in which an illustrative embodiment may be implemented. In this example, aircraft 1200 is produced by aircraft manufacturing and service method 1100 in FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included. Although an aerospace example is shown, different illustrative embodiments may be applied to other industries, such as the automotive industry. Apparatuses and methods embodied herein may be employed during at least one of the stages of aircraft manufacturing and service method 1100 in FIG. 11.

In one illustrative example, components or subassemblies produced in component and subassembly manufacturing 1106 in FIG. 11 may be fabricated or manufactured in a manner similar to components or subassemblies produced while aircraft 1200 is in service 1112 in FIG. 11. As yet another example, one or more apparatus embodiments, method embodiments, or a combination thereof may be utilized during production stages, such as component and subassembly manufacturing 1106 and system integration 1108 in FIG. 11. One or more apparatus embodiments, method embodiments, or a combination thereof may be utilized while aircraft 1200 is in service 1112, during maintenance and service 1114 in FIG. 11, or both. The use of a number of the different illustrative embodiments may substantially expedite the assembly of aircraft 1200, reduce the cost of aircraft 1200, or both expedite the assembly of aircraft 1200 and reduce the cost of aircraft 1200.

For example, components for window system 202 may be manufactured during as component and subassembly manufacturing 1106. These components may be implemented in aircraft 1200 during system integration 1108. Window system 202 may be operated while aircraft 1200 is in service 1112. Window system 202 may be operated in a manner than reduces the occurrence of inconsistencies in dimmable window panel 210 such that maintenance for window system 202 may be reduced.

Further, window system 202 may be installed in aircraft 1200 during stages other than system integration 1108 in FIG. 11. For example, window system 202 may be installed in aircraft 1200 during upgrades, refurbishment, or other operations performed during maintenance and service 1114. The installation may involve, for example, installing new components for window system 202, modifying components, or replacing selected components in window system 202.

For example, a heating system may be added to an existing window system. In another illustrative example, a window system with a shade may have the shade removed. A dimmable window panel with a heating system may be added to the window system as part of a refurbishment or upgrade.

Thus, the illustrative embodiments show a method and apparatus for managing heating of a window system in a manner that reduces maintenance for the window system. In one illustrative example, an apparatus comprises a dimmable window panel and a heating system. The dimmable window panel has an inner portion and an outer portion around the inner portion. The heating system is thermally connected to the outer portion of the dimmable window panel.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a dimmable window panel having an inner portion and an outer portion around the inner portion;
   a heating system thermally connected to the outer portion of the dimmable window panel: and
   a sensor system configured to generate data regarding a difference between a first temperature in the inner portion and a second temperature in the outer portion, wherein the sensor system comprises:
      a group of strain gauges configured to determine a thermal stress of the dimmable window panel by measuring deformation in a structure of the dimmable window panel.

2. The apparatus of claim 1, wherein the heating system is configured to heat the outer portion in a manner that reduces a temperature gradient between the inner portion and the outer portion of the dimmable window panel.

3. The apparatus of claim 1, wherein the heating system reduces undesired stress in the dimmable window panel.

4. The apparatus of claim 1 further comprising:
   a controller configured to control operation of the heating system such that a desired temperature difference between the inner portion and the outer portion of the dimmable window panel is maintained.

5. The apparatus of claim 1, wherein the sensor system is configured to generate data regarding a difference between a first temperature in the inner portion and a second temperature in the outer portion using a parameter selected from one of stress, deformation, strain, and temperature.

6. The apparatus of claim 1, wherein the sensor system comprises:
   a group of sensor devices selected from at least one of a strain gauge, an axial strain gauge, a rosette gauge, a thermometer, an infrared signature sensor, or a thermocouple.

7. The apparatus of claim 1, wherein the sensor system, being configured to generate data regarding a difference between a first temperature in the inner portion and a second temperature in the outer portion, further comprises:
   a controller configured to control operation of the heating system using the data generated by the sensor system such that a desired temperature difference between the inner portion and the outer portion of the dimmable window panel is maintained.

8. The apparatus of claim 1 further comprising:
   an inner pane;
   an outer pane; and
   a dust cover, wherein the dimmable window panel is located between the dust cover and the inner pane and the inner pane is located between the dimmable window panel and the outer pane.

9. The apparatus of claim 1, wherein the heating system comprises:
   a group of heating elements, wherein a heating element in the group of heating elements is selected from at least one of a resistive element, a thermoelectric heating device, a device that directs hot air around the outer portion, a nichrome (80% Ni/20% Cr) wire, a nichrome strip, a FeCeAL wire, a cupronickel (CuNi) wire, a ceramic heating element, or a thin film heating element comprising platinum or molybdenum.

10. The apparatus of claim 1, wherein the dimmable window panel and the heating system are located in a platform selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a house, a manufacturing facility, and a building.

11. A window system comprising:
   a dimmable window panel having an inner portion and an outer portion around the inner portion;
   a heating system thermally connected to the outer portion of the dimmable window panel;
   a sensor system configured to detect a difference between a first temperature in the inner portion and a second temperature in the outer portion and generate data regarding the difference, wherein the sensor system comprises a group of strain gauges configured to determine a thermal stress of the dimmable window panel by measuring deformation in a structure of the dimmable window panel; and
   a controller configured to receive the data from the sensor system and control operation of the heating system to maintain a desired temperature difference between the inner portion and the outer portion of the dimmable window panel based on the data received from the sensor system.

12. The window system of claim 11, wherein the heating system is configured to heat the outer portion in a manner that reduces a temperature gradient between the inner portion and the outer portion of the dimmable window panel.

13. The window system of claim 11, wherein the sensor system is configured to detect the difference between the first temperature in the inner portion and the second temperature in the outer portion using a parameter selected from one of stress, deformation, strain, and temperature.

14. The window system of claim 11 further comprising:
   an inner pane;
   an outer pane; and
   a dust cover, wherein the dimmable window panel is located between the dust cover and the inner pane and the inner pane is located between the dimmable window panel and the outer pane.

15. The window system of claim 11, wherein the window system is located in a platform selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a house, or a manufacturing facility, and a building.

16. A method for managing heating of a window system, the method comprising:
   monitoring a dimmable window panel in the window system for a difference between a first temperature in an inner portion of the dimmable window panel and a second temperature in an outer portion the dimmable window panel determined from an amount of stress and
   heating the outer portion of the dimmable window panel when an undesired amount of stress is present.

17. The method of claim 16, wherein the monitoring step comprises:
   detecting the amount of stress in the dimmable window panel using a sensor system.

18. The method of claim 17, wherein the detecting step comprises:
   detecting at least one of a deformation in the dimmable window panel or a temperature gradient between the inner portion and outer portion of the dimmable window panel.

19. The method of claim 16, wherein the heating step comprises:
   operating a heating system to heat the outer portion of the dimmable window panel while the undesired amount of stress is detected; and
   operating the heating system to cease heating the outer portion of the dimmable window panel when the undesired amount of stress is absent.

20. The apparatus of claim 1, wherein the sensor system is further configured to generate data regarding the difference between the first temperature in the inner portion and the second temperature in the outer portion using the thermal stress of the dimmable window panel, a thermal expansion coefficient of the dimmable window panel, and a Young's modulus of the dimmable window panel.

* * * * *